(12) United States Patent
Patel et al.

(10) Patent No.: US 11,824,232 B2
(45) Date of Patent: Nov. 21, 2023

(54) INTERNAL LIGHT OFF MECHANISM FOR SOLID OXIDE FUEL CELL SYSTEM STARTUP USING A SPARK IGNITOR

(71) Applicant: BLOOM ENERGY CORPORATION, Sunnyvale, CA (US)

(72) Inventors: Siddharth Patel, Menlo Park, CA (US); Aniket Pratap, Thane (IN); Michael Petrucha, Santa Clara, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 492 days.

(21) Appl. No.: 16/128,685

(22) Filed: Sep. 12, 2018

(65) Prior Publication Data
US 2019/0081334 A1 Mar. 14, 2019

Related U.S. Application Data

(60) Provisional application No. 62/558,496, filed on Sep. 14, 2017.

(51) Int. Cl.
*H01M 8/04014* (2016.01)
*H01M 8/04007* (2016.01)
(Continued)

(52) U.S. Cl.
CPC ... *H01M 8/04022* (2013.01); *H01M 8/04074* (2013.01); *H01M 8/04225* (2016.02);
(Continued)

(58) Field of Classification Search
CPC ......... H01M 8/04022; H01M 8/04225; H01M 8/04708; H01M 8/04074; H01M 8/04268; H01M 8/0662
See application file for complete search history.

(56) References Cited

U.S. PATENT DOCUMENTS 3,031,522 A * 4/1962 Clark ............... H01B 7/16
 174/102 R
3,599,616 A * 8/1971 Oishi ............... F02P 3/0884
 123/598
(Continued)

FOREIGN PATENT DOCUMENTS

CN 1292157 A 4/2001
CN 101496240 A 7/2009
(Continued)

OTHER PUBLICATIONS

KIPO Office Communication, Notification of Reason for Refusal for Korean Patent Application No. 10-2018-7030723, dated Dec. 4, 2019, 17 pages including English machine translation.
(Continued)

*Primary Examiner* — Ula C Ruddock
*Assistant Examiner* — Amanda Rosenbaum
(74) *Attorney, Agent, or Firm* — THE MARBURY LAW GROUP PLLC

(57) ABSTRACT

A fuel cell system includes at least one spark igniter containing an insulated cable where at least a first end of the insulated cable is positioned within a reaction zone of the fuel cell system. A power supply is configured to provide a direct current (DC) voltage to the at least one spark igniter such that a spark is generated at the first end of the insulated cable.

14 Claims, 3 Drawing Sheets

(51) Int. Cl.
*H01M 8/04225* (2016.01)
*H01M 8/04223* (2016.01)
*H01M 8/04701* (2016.01)
*H01M 8/12* (2016.01)

(52) U.S. Cl.
CPC ... *H01M 8/04268* (2013.01); *H01M 8/04708* (2013.01); *H01M 2008/1293* (2013.01)

(56) References Cited

U.S. PATENT DOCUMENTS

| | | | |
|---|---|---|---|
| 3,749,980 | A | 7/1973 | Baxter |
| 4,329,174 | A | 5/1982 | Ito et al. |
| 4,592,134 | A | 6/1986 | Walton |
| 4,943,494 | A | 7/1990 | Riley |
| 5,741,605 | A | 4/1998 | Gillett et al. |
| 6,512,204 | B1 | 1/2003 | Chiu et al. |
| 6,689,990 | B2 | 2/2004 | Taniguchi et al. |
| 6,800,386 | B1 * | 10/2004 | Wang .................. B01J 8/0492 429/411 |
| 6,844,525 | B2 | 1/2005 | Yoshikawa et al. |
| 7,589,460 | B2 * | 9/2009 | Lykowski ............. H01T 13/20 313/118 |
| 8,197,976 | B2 * | 6/2012 | Poshusta ........... H01M 8/04022 429/440 |
| 8,563,180 | B2 * | 10/2013 | Perry ................ H01M 8/0618 429/410 |
| 8,877,399 | B2 | 11/2014 | Weingaertner et al. |
| 8,921,001 | B2 | 12/2014 | Huynh et al. |
| 9,287,572 | B2 | 3/2016 | Weingaertner et al. |
| 9,932,656 | B2 * | 4/2018 | Hattendorf ........... H01T 13/39 |
| 2002/0170903 | A1 | 11/2002 | Taniguchi et al. |
| 2002/0195443 | A1 | 12/2002 | Tanaka et al. |
| 2004/0137302 | A1 | 7/2004 | Gilman et al. |
| 2006/0263665 | A1 | 11/2006 | Schaevitz et al. |
| 2007/0243444 | A1 | 10/2007 | Zheng et al. |
| 2009/0208784 | A1 | 8/2009 | Perry et al. |
| 2009/0258262 | A1 * | 10/2009 | Kaupert ............. H01M 8/0432 429/425 |
| 2009/0308858 | A1 | 12/2009 | England et al. |
| 2010/0009221 | A1 | 1/2010 | Ballantine et al. |
| 2010/0122975 | A1 | 5/2010 | Burrows et al. |
| 2010/0133253 | A1 | 6/2010 | Walker, Jr. |
| 2010/0147822 | A1 | 6/2010 | Burrows et al. |
| 2010/0167154 | A1 | 7/2010 | Ono |
| 2010/0183993 | A1 | 7/2010 | McAlister |
| 2012/0196194 | A1 | 8/2012 | Perry et al. |
| 2012/0202130 | A1 | 8/2012 | Weingaertner et al. |
| 2012/0270117 | A9 | 10/2012 | Venkataraman et al. |
| 2014/0162162 | A1 | 6/2014 | Kalika et al. |
| 2014/0261323 | A1 | 9/2014 | McAlister |
| 2015/0111121 | A1 | 4/2015 | Weingaertner et al. |
| 2015/0288006 | A1 * | 10/2015 | Arcelona ............... F23Q 7/001 429/434 |

FOREIGN PATENT DOCUMENTS

| | | | | |
|---|---|---|---|---|
| CN | 103311560 | A | | 9/2013 |
| GB | 2094883 | A | * 9/1982 | ........... H01T 13/462 |
| JP | H11-287441 | A | | 10/1999 |
| JP | 2003-148731 | A | | 5/2003 |
| JP | 2004-107135 | A | | 4/2004 |
| JP | 2012-512373 | A | | 5/2012 |
| JP | 2013-055008 | A | | 3/2013 |
| JP | 2014-057759 | A | | 3/2014 |
| KR | 1020070043546 | A | | 4/2007 |
| WO | WO94-03305 | A1 | | 2/1994 |

OTHER PUBLICATIONS

International Search Report and Written Opinion received in connection with international application No. PCT/US2013/070505; dated Feb. 24, 2014.
Promat Freeflow®, Free Pouring Granules of High Temperature Insulation, http://www.microtherm.uk.com/landingpage/assets/TDS_FREEFLOW_V1-EN.pdf, Nov. 2013.
International Search Report for PCT/US2015/022122, dated Jul. 31, 2015, 3 pages.
Written Opinion of the International Searching Authority for PCT/US2015/022122, dated Jul. 31, 2015, 12 pages.
International Preliminary Report on Patentability for International Search Report for PCT/US2015/022122, dated Oct. 13, 2016, 14 pages.
First Office Action from Japan Patent Office for Japanese Patent Application No. 2016-556296, dated Aug. 7, 2018, 4 pages.
https://www.autoanything.com/ignition-systems/glow-plugs-vs-spark-plugs, visited Aug. 27, 2018.
U.S. Appl. No. 62/614,574, filed Jan. 8, 2018, Bloom Energy.
International Search Report and Written Opinion of the International Searching Authority for International Patent Application No. PCT/US2018/050578, dated Jan. 2, 2019, 16 pages.
Notification Concerning Transmittal of International Preliminary Report on Patentability and Written Opinion of the International Searching Authority for International Patent Application No. PCT/US2018/050578, dated Mar. 26, 2020, 8 pages.

* cited by examiner

INTERNAL LIGHT OFF MECHANISM FOR SOLID OXIDE FUEL CELL SYSTEM STARTUP USING A SPARK IGNITOR

CROSS-REFERENCE TO RELATED APPLICATIONS

The present application claims priority to U.S. Provisional Application No. 62/558,496 filed Sep. 14, 2017, the entire contents of which are incorporated by reference herein.

FIELD

The present invention is directed to fuel cell systems, and more specifically, to a spark igniter for a solid oxide fuel cell (SOFC) system.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

Various embodiments relate to a fuel cell system, comprising: a fuel cell stack and a reaction zone configured to receive a fuel/air mixture; at least one spark igniter comprising an insulated cable, wherein at least a first end of the insulated cable is positioned within the reaction zone; and a power supply configured to provide a direct current (DC) voltage to the at least one spark igniter such that a spark is generated at the first end of the insulated cable.

Various embodiments provide a method of heating a fuel cell system including a hotbox housing a fuel cell stack, the method comprising: providing a first end of an insulated cable within a flow path of a fuel/air mixture in a reaction zone in the hotbox; applying a direct current (DC) voltage to a second end of the mineral insulated cable, wherein the second end is disposed outside of the hotbox; generating a spark at the first end of the mineral insulated cable using the DC voltage; and heating the fuel/air mixture in the reaction zone using the spark.

DETAILED DESCRIPTION

Components such as glow plugs may be inserted through feed-through holes in a hotbox of a fuel cell system. Glow plugs are fuel cell system components having a heating element that provides heat for initiating fuel cell system operation or reaction. Specifically, the heating element of a glow plug is electrically connected to a power supply, and provides heating when current is applied. Glow plugs are typically inserted into a reaction chamber of a fuel cell system, often contained within a housing of a glow plug assembly. For example, glow plugs may be inserted into an anode tail gas oxidizer (ATO) of a fuel cell system, and may operate to initiate a fuel exhaust oxidation reaction between cathode (i.e., air) exhaust and anode (i.e., fuel) exhaust streams during system startup. Since glow plugs are typically provided into reaction chambers through feed-through holes, sealing is typically needed to prevent leaks that may occur between the glow plug assembly and the housing (e.g., hotbox) that supports the element and facilitates insertion. However, because of extreme temperature conditions and variations, differences in coefficients of thermal expansion (CTEs) between the hotbox and a ceramic glow plug may cause stresses leading to micro-crack formation in the glow plug area, which may give rise to leaks and reduce the operational reliability and longevity of the fuel cell system.

Further, during steady-state operation, a ceramic glow plug may be exposed to high temperatures, which may oxidize brazing used to connect the wire leads to the ceramic components of the glow plug. Such oxidation may result in an open circuit condition, leading to the deactivation of the ceramic glow plug.

Embodiments of the present invention are drawn to a spark igniter that uses a spark-generating mineral insulated cable, and fuel cell systems, such as solid oxide fuel cell (SOFC) systems, including the same. As used herein, a spark igniter is synonymous with a spark plug, and is different from a prior art glow plug. The spark igniter may be positioned in a hotbox of a fuel cell system so that a first end of the mineral insulated cable is within the flow path of a mixture of, for example, fuel cell stack air exhaust stream and/or an external oxidizing air stream and fuel cell stack fuel exhaust stream in the ATO. When the mineral insulated cable is energized with high DC voltage, a spark is ignited at the first end within the ATO. As a result, a light-off/operating temperature to initiate oxidation of fuel exhaust within the ATO may be quickly achieved without requiring a high amount of power consumption. Further, due to the flexibility of the mineral insulated cable, the spark igniters in various embodiments may be easily routed within the hotbox without risking potential micro-cracks in seals and/or feed through holes, and determination of wire lead brazing that is possible in a ceramic glow plug.

Figure 1:
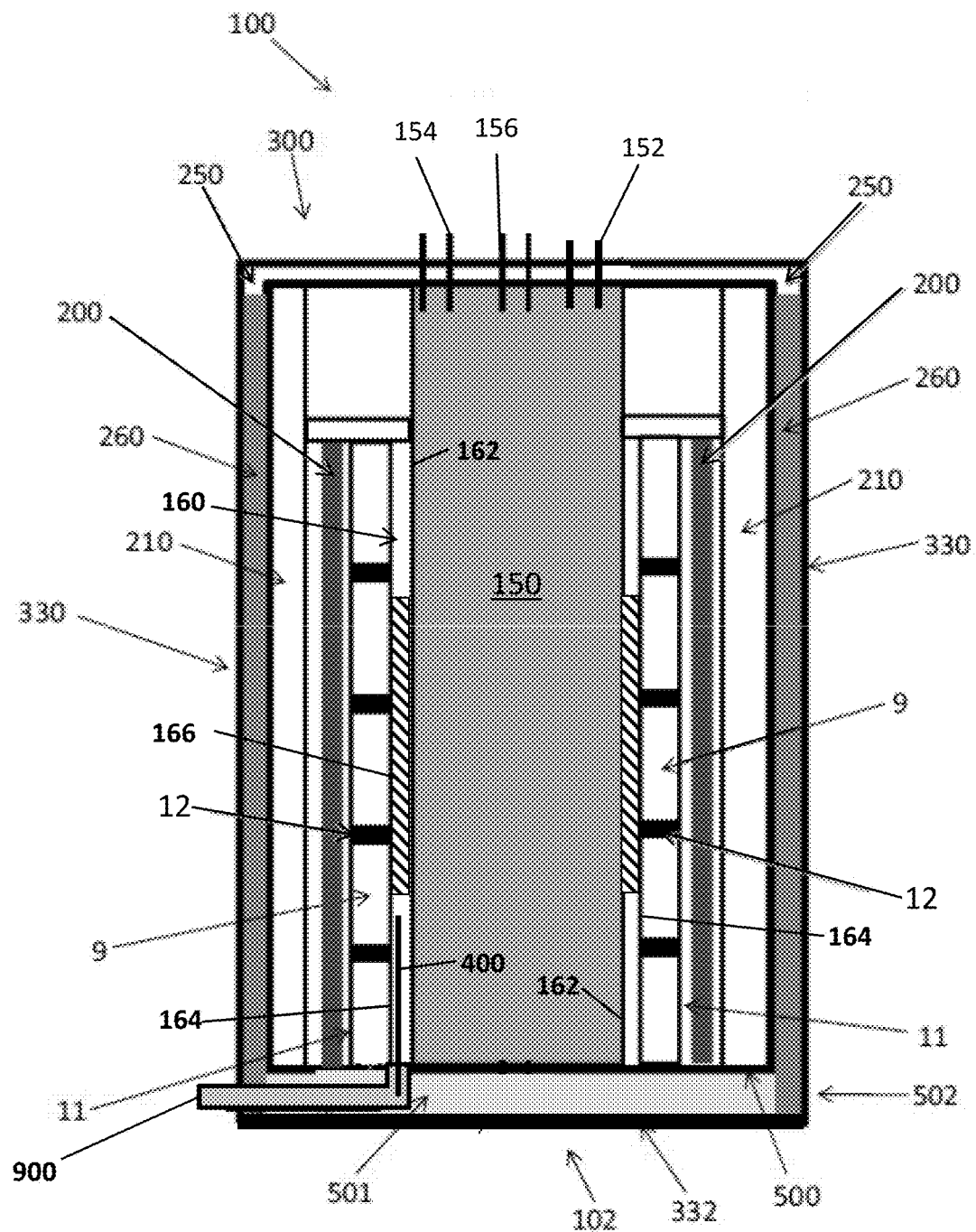
FIG. 1 is a schematic illustration of a cross section of a fuel cell system according to an exemplary embodiment.

FIG. 1 is a cross section illustrating a first embodiment of a fuel cell system 100. The system 100 includes one or more columns 11 of fuel cell stacks 9 located on a stack support base 500. Each fuel cell stack 9 includes one or more fuel cells and interconnects as described in the U.S. Pat. Nos. 8,877,399 or 9,287,572, hereby incorporated by reference in their entirety. Optional fuel manifolds 12 may be located between the fuel cell stacks 9 in the columns 11. The columns 11 of fuel cell stacks 9 may be arrayed about a central plenum 150. The central plenum 150 may include various balance of plant components, such as a reformer and/or heat exchanger, such as an anode cooler heat exchanger and/or an anode exhaust gas recuperator (not shown). The central plenum 150 of the system 100 also includes a fuel input conduit 152, an oxidant (e.g. air) input conduit 154, and a fuel/oxidant exhaust output conduit 156 (e.g., anode tail gas oxidizer output comprising fuel exhaust oxidized by the oxidant exhaust).

The fuel cell system 100 may also include a cathode recuperator heat exchanger 200 located about an outer periphery of the columns 11 of fuel cell stacks 9. To insulate the fuel cell system 100 from heat loss, a resilient insulating layer 210 may be provided in the gap between the cathode recuperator 200 and a sidewall 330 of a hotbox 300 (e.g. outer housing) of the fuel cell system 100. To further insulate the fuel cell system 100, a compliant insulating layer 260 may be provided in gap 250 between the resilient insulating layer 210 and the sidewall 330 of the outer housing 300 of the fuel cell system 100. The resilient insulation layer 210 may be made of any suitable thermally insulating resilient material, such as a pourable material, e.g., a free flow material or a solid granular material. The compliant layer 260 may be made of any suitable material, such as thermally resistant felt, paper, or wool. As used herein, a "compliant" material is a material that compresses and expands by at least 10 volume percent without damage.

A base cavity 102 that is at least partially defined by stack support base 500, the bottom wall 332 of the base pan 502 of the housing 300 and the sidewall 330 of the outer housing 300, may be filled with a base insulation 501, such as a microporous board, a pourable insulation, or a combination thereof. In an exemplary embodiment, the base insulation 501 fills one quarter or less of the volume of the base portion cavity 102 of the housing 300.

The stack support base 500 may contain a bridging tube 900 made of an electrically insulating material, such as a ceramic, or it may be made of a conductive material that is joined to a ceramic tube outside the base pan 502. A sheet metal retainer may be used to fix the tube 900 to the base pan 502. The bridging tube 900 may be used to provide an insertion point and routing for one or more spark igniter, such as the various mineral insulated cables described herein.

The fuel cell system 100 may include an anode tail gas oxidizer (ATO) 160 having an outlet fluidly connected to the inlet of the cathode recuperator heat exchanger 200, whose outlet is connected to the exhaust output conduit 156. The ATO 160 may be located between the fuel cell stacks 9 and the central plenum 150. The ATO 160 is configured to oxidize anode (e.g., fuel) exhaust received from the fuel cell stacks 9 using cathode (e.g., air) exhaust received from the fuel cell stacks 9 via one or more conduits. In various embodiments, the ATO 160 may contain a suitable oxidation reaction promoting catalyst, such as nickel. In some embodiments, the ATO may comprise inner and outer cylindrical or other suitably shaped walls 162, 164 with the catalyst block or ring 166 located in the space between the walls 162, 164.

In various embodiments, an ATO fuel inlet stream may mix and react with an ATO air inlet stream in the ATO. The ATO fuel inlet stream may comprise at least a portion of a fuel cell stack 9 anode exhaust stream that has passed through an anode recuperator (i.e., fuel heat exchanger located in the central plenum). An ATO air inlet stream may include a stack cathode exhaust stream which flows from the fuel cell stacks 9 to the ATO 160, or a fresh air inlet stream.

The one or more ATO fuel inlet stream is oxidized by the ATO air inlet stream (e.g., the stack cathode exhaust stream or a mixture of the cathode exhaust and the optional fresh air inlet streams). The ATO exhaust stream (i.e., oxidized fuel) is removed from the ATO through the exhaust output conduit 156 after passing through the cathode recuperator heat exchanger 200.

The fuel cell system 100 may include one or more spark igniters 400 configured by create an electrical discharge in order to ignite fuel and oxidant mixtures within one or more reaction zones in the fuel cell system 100. For example, the glow plug may be a spark igniter that extends through the hotbox 300 into the ATO 160. The glow plug may be configured to heat an air/fuel mixture provided to the ATO 160 at least during startup of the fuel cell system 100, such that oxidation of the fuel (e.g., hydrogen and/or hydrocarbon fuel which remains in the stack 9 fuel exhaust stream) of the mixture occurs in the ATO 160. The oxidized mixture is then provided from the ATO 160 into the cathode recuperator heat exchanger 200. The spark igniter 400 may be operated only during system 100 start-up or during both start-up and steady-state operation of the system 100. The spark igniter 400 is not limited to extending through any particular location in the hotbox 300. For example, the spark igniter 400 may be disposed in any suitable position for heating and/or initiating oxidation in the ATO 160. As shown in FIG. 1, if catalyst block or ring 166 does not extend to the bottom of the ATO 160, then the spark igniter 400 may extend upwards in the empty space between the inner and outer walls 162, 164 of the ATO 160 up to the bottom of the catalyst block or ring 166.

Spark igniter 400 may protrude out of a bridging tube 900 inside empty space in the ATO 160. Spark igniter 400 in various embodiments may use a mineral (e.g., ceramic) insulated cable that generates the spark at a first end. The mineral insulated cable may be positioned such that a portion of the cable is within an ATO, between the inner and outer walls 162, 164 of the ATO 160. By providing the spark within the ATO, a light-off temperature may be achieved to initiate oxidation of the fuel with air during startup of the fuel cell system.

In some embodiments, the bridging tube 900 may provide access to an ATO thermocouple feed may extend through the ATO, and the temperature of the ATO may be monitored by inserting a thermocouple through this feed. In some embodiments, a thermocouple (e.g., N-type thermocouple) cable may be used as the mineral insulated cable of a spark igniter in various embodiments.

In some embodiments, a spark igniter 400 in a fuel cell system may be comprised of a single core mineral insulated cable. The single core mineral insulated cable may be constructed with a conductive wire core, mineral (e.g., ceramic) electrical insulation surrounding the conductive wire, and a conductive outer sheath around the mineral insulation. The conductive wire core and outer sheath may each be made of a high temperature rated (e.g., at least 1000° C.) metal alloy. For example, the conductive wire core and sheath may be made of an Inconel alloy (e.g., a Ni—Cr—Fe based alloy) such as Inconel 660, etc. In some embodiments, the mineral insulation may be magnesium oxide (MgO). In operation, when energized by a power source, a spark may be generated between the conductive wire core and the outer sheath at one end of the single core mineral insulated cable.

In some other embodiments, a spark igniter 400 may be comprised of a multi-core mineral insulated cable. The multi-core mineral insulated cable may be constructed with at least two conductive wire cores, isolated from one another by mineral electrical insulation surrounding the conductive wire cores, and an outer sheath around the mineral insulation. The conductive wire cores may be made of one or more high temperature rated metal alloy, such as Inconel. The outer sheath may be electrically conductive or insulating. In operation, when energized by a power source, a spark may be generated between multiple (e.g., two) conductive wire cores at one end of the multi-core mineral insulated cable.

In some embodiments, the multi-core mineral insulated cable may be an N-type thermocouple cable configured with a first conductive wire core made of a nickel-chromium-silicon alloy (e.g., Nicrosil) and a second conductive wire made of a nickel-silicon alloy (e.g., Nisil). For example, a typical Nicrosil alloy may contain around 14-15 wt % chromium, such as around 14.2-14.5% silicon; around 1-2 wt % silicon, such as 1.4-1.6 wt % silicon; and at least 83 wt % nickel, such as around 84-86 wt % nickel. A typical Nisil alloy may contain 4 to 5 wt % silicon, such as around 4.4 wt % silicon, and at least 94 wt % nickel, such as 95-96 wt % nickel.

In some embodiments, wiring for an N-type thermocouple configured to monitor ATO temperature may be repurposed for use as a spark igniter as described herein by applying voltage between the cores.

In some embodiments, the single core or multi-core mineral insulated cable may be coupled to an on-off timer, which may be programmed to be "on" for a given time (e.g., 0.1 to 10 seconds, such as 1-2 seconds), followed by turning "off" for a given time (e.g., 0.1 to 10 seconds, such as 1-2 seconds). Therefore, the mineral insulated cable may generate a spark with a duration of 1-2 seconds, with 1-2 second intervals in between.

The use of a single core or multi-core mineral insulated cable in various embodiments may provide a quick and cost-effective mechanism for initiating oxidation within the ATO. Spark igniters that use such mineral insulated cables have relatively low power consumption requirements, and may be made of materials that are able to withstand very high temperatures inside the ATO. Further, such mineral insulated cables provide mechanical flexibility that enables routing within the hotbox (e.g., up to the catalyst block 166 within the ATO 160).

Figure 2A:
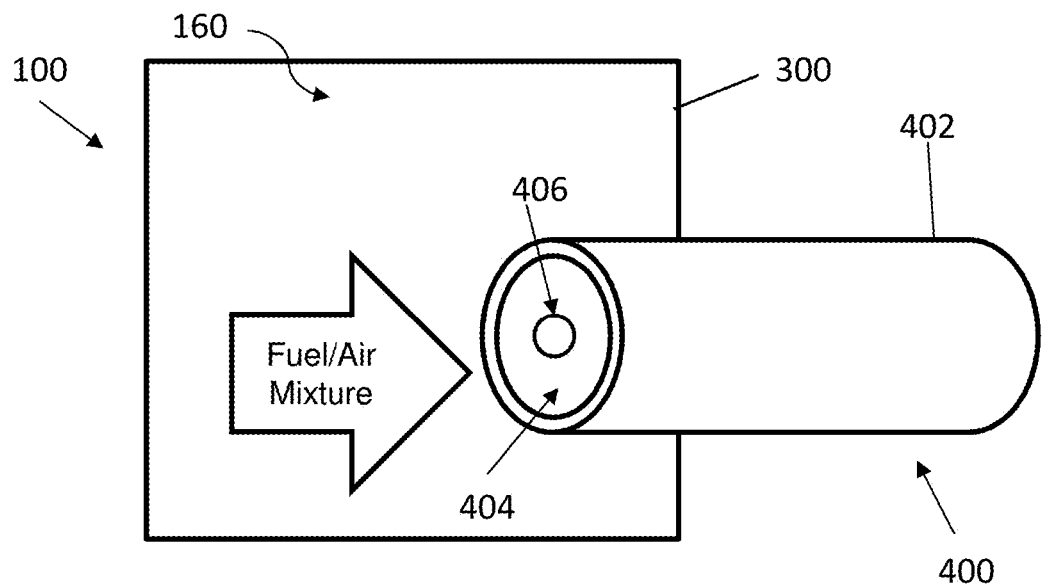
FIG. 2A is a schematic illustration of a fuel cell system including a spark igniter according to another exemplary embodiment.
Figure 2B:
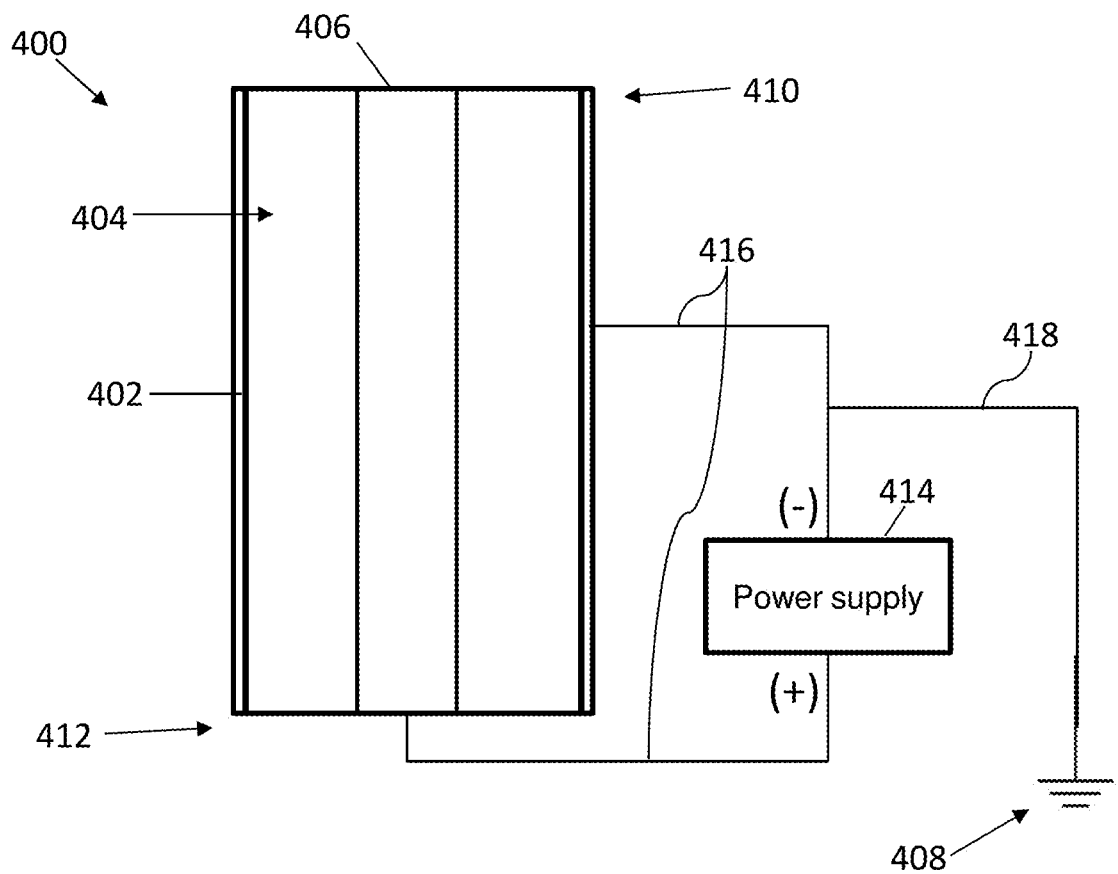
FIG. 2B is a schematic illustration of components including the spark igniter of the fuel cell system of FIG. 2A according to various embodiments.

FIGS. 2A and 2B are schematic diagrams of a spark igniter 400 that includes a single core mineral insulated cable for spark ignition in the fuel cell system 100. Referring to FIGS. 2A and 2B, the spark igniter 400 includes an outer sheath 402, insulation 404, and a conductive wire core 406. In various embodiments, the outer sheath 402 may be formed of an electrically conductive material, such as a metal or metal alloy. In some embodiments, the outer sheath 402 may have a ground connection 408, which enables the outer sheath 402 to be integrated with and/or placed in direct contact with the housing of the hotbox 300. The outer sheath 402 may be in the form of a hollow chamber having any suitable shape. For example, the housing 402 may be cylindrical or prismatic. The spark igniter 400 may have a first end 410 configured to receive an air/fuel mixture from a reaction zone (e.g., the ATO 160) within the hotbox 300, and an opposing second end 412 disposed outside of the hotbox 300. In particular, the first end 410 may be inserted into a path of an air/fuel gas mixture within the ATO, such as at or near the catalyst block or ring 166.

The insulation 404 may be formed of a dielectric material and may be configured to prevent electrical shorting between the outer sheath 402 and the conductive core wire 406 at locations other than the first end 410. In some embodiments, the insulation 404 may be formed of a ceramic material such as magnesium oxide, alumina, ceramic matrix composite (CMC) material or the like. However, the insulation 404 may be formed of any dielectric material capable of withstanding high temperatures, such as fuel cell system operating temperatures between 700° C. and 950° C. The conductive wire core 406 may be disposed in the center of the insulation 404, inside the outer sheath 402. As described, the conductive wire core 406 may formed of an Inconel alloy or other metal alloy.

At the second end 412, the spark igniter 400 conductive wire core 406 and the outer sheath 402 may be electrically connected to a power source 414. For example, the conductive wire core 406 may be connected to a positive terminal of the power source 414, and the outer sheath 402 may be connected to a negative terminal of the power source 414. The power source 414 may be configured to apply a DC voltage to the outer sheath 402 and the conductive wire core 406. The power source 414 may be disposed outside of the hotbox 300 at any location having a temperature of less than about 100° C., such as a temperature ranging from about room temperature to about 40° C., during fuel cell system operation. In some embodiments, the wiring to the power source 414 may be protected from fuel cell operating temperatures to avoid wire degradation and/or delamination.

In various embodiments, the power supply 414 may be configured to supply a high DC voltage between the conductive wire core 406 and the outer sheath 402 to create a spark between the outer sheath 402 and the conductive wire core 406 at the first end 410 of the spark igniter 400. For example, the power supply 414 may be a regulated DC to high voltage (HV) DC converter coupled to a DC voltage source. The DC voltage source may provide a 20V to 28V, such as 24V, DC voltage to the regulated DC to HV DC converter, which may output a high DC voltage. For example, the DC voltage source may supply a 22V to 26V DC voltage, such as a 24V DC voltage, and the regulated DC to HV DC converter may output a 600V DC voltage or higher, such as a 1500V to 3000V DC voltage. In some embodiments, the DC voltage source may be an energy storage unit such as a battery. In some embodiments, the high DC voltage output from the power supply 414 may have an output power of about 10 Watts or lower, according to some embodiments. However, the power supply 414 is not limited to any particular voltage or power, so long as the supplied current is sufficient for the core(s) to initiate combustion of a fuel/air mixture.

Figure 3A:
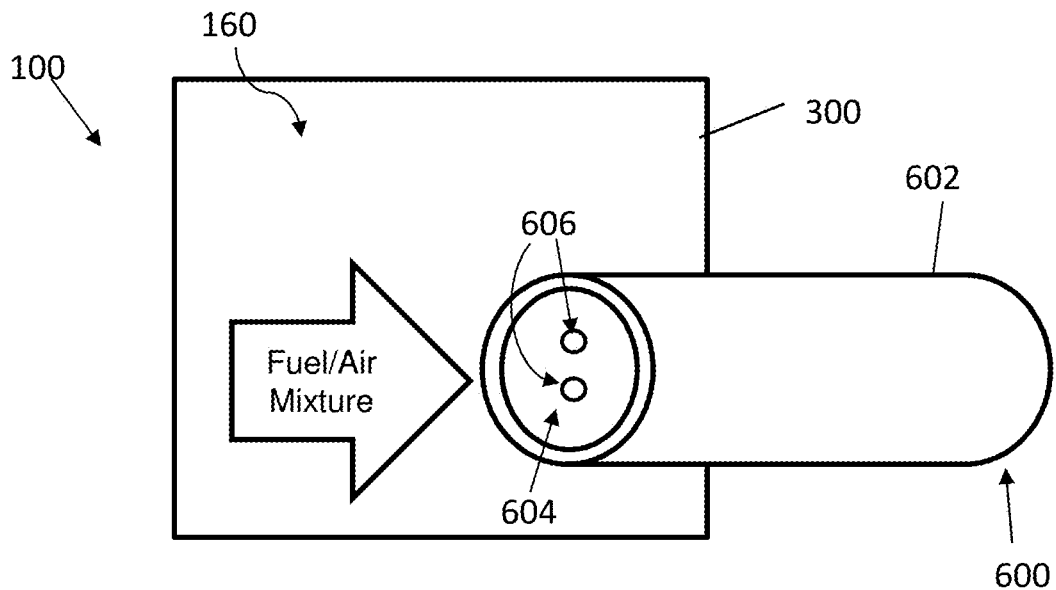
FIG. 3A is a schematic illustration of a fuel cell system including a spark igniter according to another exemplary embodiment.
Figure 3B:
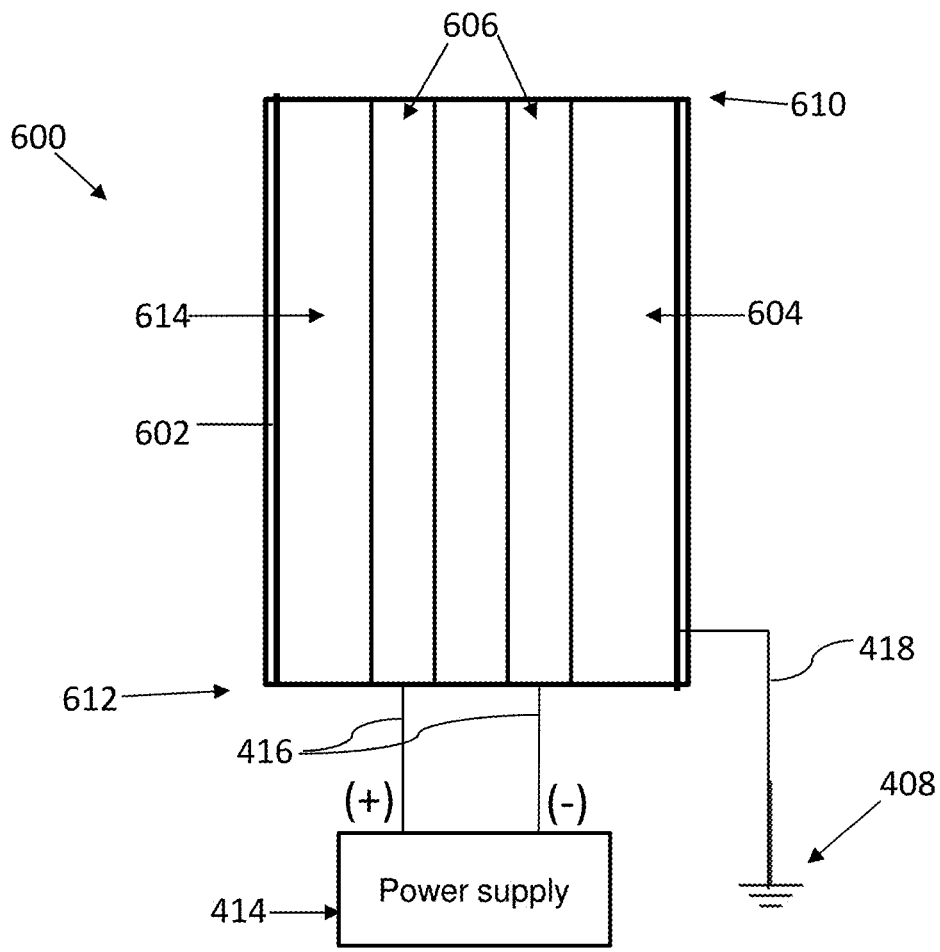
FIG. 3B is a schematic illustration of components including the spark igniter of the fuel cell system of FIG. 3A according to various embodiments.

FIGS. 3A and 3B are schematic diagrams of a spark igniter 600 that includes a multi-core mineral insulated cable for spark ignition in the fuel cell system 100. Referring to FIGS. 3A and 3B, the spark igniter 600 includes an outer sheath 602, an insulation 604, and two conductive wire cores 606. In various embodiments, the outer sheath 602 may be formed of an electrically conductive material, such as a metal or metal alloy. In some embodiments, the outer sheath 602 may have a ground connection 408, enabling the outer sheath 602 to be integrated with and/or placed in direct contact with the housing of the hotbox 300. The outer sheath 602 may be in the form of a hollow chamber having any suitable shape. For example, the housing 602 may be cylindrical or prismatic. The spark igniter 600 may have a first end 610 configured to receive an air/fuel mixture from a reaction zone (e.g., the ATO 160) within the hotbox 300, and an opposing second end 612 disposed outside of the hotbox 300. In particular, the first end 610 may be inserted into a path of an air/fuel gas mixture within the ATO, such as at or near the catalyst block or ring 166.

The insulation 604 may be formed of a dielectric material and may be configured to prevent electrical shorting between the outer sheath 602 and the conductive core wires 606 and to prevent electrical shorting between the conductive core wires 606 at all locations other than at the first end

610. In some embodiments, the insulation 604 may be formed of MgO, $Al_2O_3$, CMC, or the like. However, the insulation 604 may be formed of any dielectric material capable of withstanding high temperatures, such as fuel cell system operating temperatures.

The conductive wire cores 606 may be disposed within the mineral insulation 604 to be electrically isolated from one another within the insulation 604 except at the first end 610. As described, each of the two conductive wire cores 606 may formed of an Inconel alloy or other metal alloy (e.g., a nickel-chromium-silicon alloy (Nicrosil), a nickel-silicon alloy (Nisil), or other).

At the second end 612 of the spark igniter 600, the conductive wire cores 606 may be electrically connected to a power source 414. For example, one conductive wire core 606 may be connected to the positive terminal of the power source 414, and the other conductive wire core 606 may be connected to the negative terminal of the power source 414. As described above with respect to FIGS. 2A and 2B, the power source 414 may be configured to supply a high direct current (DC) voltage between the conductive wire cores 606 to generate a spark at the first end 610 of the spark igniter 600. For example, the power supply 414 may be a regulated DC to high voltage (HV) DC converter coupled to a DC voltage source.

In the spark igniters of various embodiments (e.g., 400, 600), the insulated cable may optionally be enclosed by one or more sealing element, which may be formed from a thin sheet of metal (e.g., austenitic nickel-chromium alloy), glass, or a combination thereof. In particular, the sealing element may provide superior high temperature oxidation resistance properties. In some embodiments, a sealing element may operate to isolate the first end 410, 610 of the mineral insulated cable in a reaction chamber. Such sealing element may have a coefficient of thermal expansion (CTE) that is selected to minimize the formation of micro-crack. Herein, a "CTE" refers to a fractional change in dimension per degree change in temperature at a constant pressure. Several types of CTEs may be referenced, such as volumetric CTE, area CTE, and linear CTE. In order to be compatible, the respective CTEs of the sealing element(s) and materials of the insulated cable may be closely matched, over the operating temperature ranges to which these elements are exposed.

In various embodiments, the optional sealing element(s) may be sufficiently thin, so as reduce stress on the insulated cable. For example, a sealing element may be formed from a thin sheet of metal that is sufficiently compliant to conform to changes in the diameter or shape of the mineral insulated cable during thermal cycles. The sealing element(s) may be further advantageously formed from an alloy to improve the properties thereof. For example, a sealing element may be formed from an austenitic nickel-chromium alloy, such as an Inconel alloy, in order to provide superior high temperature oxidation resistance properties similar to the outer sheath of the mineral insulated cable.

In some embodiments, the spark igniter (e.g., 400, 600) may optionally include one or more lead connection wires 416 coupled to the conductive wire core(s) (e.g., 406, 606) of the insulated cable. For example, the lead connection wire(s) may be Nisil lead wires, and may be brazed to the conductive wire core(s) using ABA gold braze. In some embodiments, the lead connection wire(s) may be flattened at the point of contact with the insulated cable prior to brazing, to increase an electrical contact area. The lead connection wire(s) may be coupled to the conductive wire core(s) at the second end (e.g., 412, 612) in order to connect to the power supply (e.g., 414) and/or a timer.

In some embodiments, the spark igniter (e.g., 400) may optionally further include one or more additional lead connection wires 418 coupled the outer sheath (e.g., 406) of the mineral insulated cable, near the second end (e.g., 412). In some embodiments, the additional lead connection wire(s) 418 may also be Nisil lead wire, which may be coupled through ABA gold brazing to the outer sheath near the second end (e.g., 412) in order to connect to the power supply (e.g., 414) and/or a timer.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell system, comprising:
a hotbox comprising a support base;
a central plenum disposed in the hotbox on the support base;
fuel cell stacks disposed in the hotbox on the support base and surrounding the central plenum;
an anode tail gas oxidizer (ATO) disposed in the hotbox and containing a reaction zone disposed between the central plenum and the fuel cell stacks and configured to receive a fuel/air mixture;
a bridging tube extending through the support base and providing access to the ATO;
a flexible insulated cable spark igniter that extends laterally through the bridging tube and then vertically upward into the ATO, such that a first end of the insulated cable spark igniter is positioned within the reaction zone, and a second end of the insulated cable spark igniter is positioned outside of the hotbox; and
a power supply configured to provide a direct current (DC) voltage to the insulated cable spark igniter such that a spark is generated at the first end of the insulated cable spark igniter.

2. The fuel cell system of claim 1, wherein the insulated cable spark igniter comprises:
an outer sheath comprising a metal alloy;
insulation surrounded by the outer sheath; and
at least one conductive wire core disposed within the insulation.

3. The fuel cell system of claim 2, wherein the outer sheath is coupled to a ground connection.

4. The fuel cell system of claim 2, wherein the insulation comprises magnesium oxide (MgO).

5. The fuel cell system of claim 2, wherein:
the at least one conductive wire core comprises at least two conductive wires that are electrically isolated from each other within the insulation; and
the power supply is configured to generate the spark by an electrical discharge between the at least two conductive wires at the first end of the insulated cable.

6. The fuel cell system of claim 5, wherein the at least two conductive wires include:
a first conductive wire comprising a nickel-chromium-silicon alloy; and
a second conductive wire comprising a nickel-silicon alloy.

7. The fuel cell system of claim 2, wherein:
the at least one conductive wire core comprises a single conductive wire; and
the power supply is configured to generate the spark by an electrical discharge between the conductive wire and the outer sheath at the first end of the insulated cable spark igniter.

8. The fuel cell system of claim 7, wherein the outer sheath and the conductive wire each comprise a nickel-chromium alloy.

9. The fuel cell system of claim 1, wherein:
the power supply comprises a regulated DC to high voltage (HV) DC converter coupled to a DC voltage source, wherein:
the regulated DC to HV DC converter is electrically connected to the at least one spark igniter; and
the converter is configured to provide a DC voltage to the insulated cable spark igniter of at least 600 volts.

10. The fuel cell system of claim 9, wherein the power supply is integrated with a timer control that is configured to cause a periodic on-off cycle in the DC voltage provided to the insulated cable spark igniter.

11. The fuel cell system of claim 10, wherein the power supply is configured to continue the periodic on-off cycle in the DC voltage until an oxidation reaction is initiated in the reaction zone.

12. The fuel cell system of claim 1, wherein the ATO includes a catalyst block or ring.

13. The fuel cell system of claim 12, wherein:
the catalyst block or ring does not reach the bottom of the ATO; and
the insulated cable spark igniter extends toward the catalyst.

14. The fuel cell system of claim 13, further comprising:
stack fuel and air exhaust conduits fluidly connected to an ATO inlet,
wherein the catalyst block or ring is located between inner and outer walls of the ATO.

* * * * *